(12) United States Patent
Warnaar

(10) Patent No.: US 11,928,837 B2
(45) Date of Patent: *Mar. 12, 2024

(54) LANDMARK CONFIGURATION MATCHER

(71) Applicant: Applied Research Associates, Inc., Albuquerque, NM (US)

(72) Inventor: Dirk B. Warnaar, Raleigh, NC (US)

(73) Assignee: Applied Research Associates, Inc., Albuquerque, NM (US)

( * ) Notice: Subject to any disclaimer, the term of this patent is extended or adjusted under 35 U.S.C. 154(b) by 79 days.

This patent is subject to a terminal disclaimer.

(21) Appl. No.: 17/490,578

(22) Filed: Sep. 30, 2021

(65) Prior Publication Data
US 2022/0020169 A1    Jan. 20, 2022

Related U.S. Application Data

(63) Continuation of application No. 16/818,552, filed on Mar. 13, 2020, now Pat. No. 11,164,330.

(51) Int. Cl.
*G06T 7/00* (2017.01)
*G01C 21/04* (2006.01)
*G06T 7/73* (2017.01)
*G06T 7/80* (2017.01)
*H04N 13/00* (2018.01)
*H04N 13/111* (2018.01)

(52) U.S. Cl.
CPC ............. *G06T 7/73* (2017.01); *G01C 21/04* (2013.01); *G06T 7/80* (2017.01); *H04N 13/111* (2018.05); *G06T 2207/30244* (2013.01)

(58) Field of Classification Search
CPC ... G06T 7/73; G06T 7/80; G06T 2207/30244; H04N 13/111; G01C 21/04
See application file for complete search history.

(56) References Cited

U.S. PATENT DOCUMENTS

| | | | |
|---|---|---|---|
| 6,930,715 B1* | 8/2005 | Mower | G06T 19/006 |
| | | | 348/207.99 |
| 7,305,983 B1* | 12/2007 | Meder | G01W 1/12 |
| | | | 126/621 |
| 2007/0025183 A1* | 2/2007 | Zimmerman | G01S 15/89 |
| | | | 367/909 |
| 2011/0093458 A1* | 4/2011 | Zheng | G06F 16/24578 |
| | | | 707/E17.109 |
| 2012/0136573 A1* | 5/2012 | Janardhanan | G01C 22/006 |
| | | | 701/500 |
| 2015/0323648 A1* | 11/2015 | Haglund | G06T 7/80 |
| | | | 701/4 |
| 2017/0301104 A1* | 10/2017 | Qian | G06F 16/583 |
| 2017/0366814 A1* | 12/2017 | Adsumilli | H04N 19/167 |

(Continued)

*Primary Examiner* — Zhihan Zhou
(74) *Attorney, Agent, or Firm* — Erise IP, P.A.

(57) ABSTRACT

Systems and techniques for determining a list of geographic location candidates from an image of an environment are described. Open source data indicative of the earth's surface may be obtained and combined into grids to create region data to gain a representation of the earth's surface within each grid cell. An image of an environment may be obtained from an unknown camera. Image characteristics may be compared to the region data to determine error between the image characteristics and projections of the region data. A list of lowest error geographic location candidates may be determined and provided to the user.

20 Claims, 8 Drawing Sheets

(56) References Cited

U.S. PATENT DOCUMENTS

| | | | |
|---|---|---|---|
| 2018/0014161 A1* | 1/2018 | Warren | G06F 16/24578 |
| 2018/0259339 A1* | 9/2018 | Johnson | G05D 1/0692 |
| 2018/0262789 A1* | 9/2018 | Foulzitzis | H04N 21/4223 |
| 2019/0045212 A1* | 2/2019 | Rose | H04N 23/698 |
| 2019/0094379 A1* | 3/2019 | Chhokra | G01S 19/42 |
| 2019/0346572 A1* | 11/2019 | Fowe | G01S 19/06 |
| 2020/0043186 A1* | 2/2020 | Selviah | G06T 7/33 |
| 2020/0109962 A1* | 4/2020 | Soni | G06V 10/751 |
| 2020/0132858 A1* | 4/2020 | Viswanathan | G05D 1/0278 |
| 2020/0334900 A1* | 10/2020 | Bouttefroy | G06V 10/82 |

* cited by examiner

US 11,928,837 B2

LANDMARK CONFIGURATION MATCHER

RELATED APPLICATIONS

This patent application is a continuation application claiming priority benefit, with regard to all common subject matter of U.S. patent application Ser. No. 16/818,552, filed Mar. 13, 2020, and entitled "LANDMARK CONFIGURATION MATCHER" ("the 552 application"). The identified earlier-filed patent application is hereby incorporated by reference in its entirety into the present application

GOVERNMENT LICENSE RIGHTS

This invention was made with government support under NGA Project Announcement #HM0476-18-9-1004 awarded by the National Geospatial-Intelligence Agency. The government has certain rights in the invention.

BACKGROUND

1. Field

Embodiments of the invention generally relate to geolocation, and more particularly to techniques for determining the position, orientation and focal length of a photo or video image where this data is unavailable.

2. Related Art

Traditionally, determining an unknown location from an image taken with an unknown camera and unknown camera parameters (tilt, roll, focal length, etc.) relies upon measuring angles (triangulation) or distances (trilateration) to predetermined points of known location (i.e., landmarks) visible in the image. For example, celestial navigation relies upon measuring the angles to known stars whose positions are recoded in ephemerides, thus serving as landmarks for geolocation. Similarly, global positioning system navigation relies on determining the distances to a number of satellites that continually broadcast their positions. However, in some circumstances, such as a picture taken of a mountain range in Afghanistan, the size of the area in which the image may have been taken is too large and the features visible in the image too common to associate them with landmarks to rely on time-consuming manual methods such as resection.

What is needed is a technique that can quickly and automatically identify a location utilizing visual information exclusively. Specifically, when a location and camera information is not known but visual information such as, for example, horizons, ridgelines, landcover, and landmarks are known, the location can be determined by estimating the camera and image characteristics and comparing them to known environmental information.

SUMMARY

Embodiments of the invention address the above-described need by providing for novel techniques for determining a location based on visual information. The user may obtain a video or a photo with no information on the location, pose or other information about the camera and compare features of the surrounding environment visible in the video or a photo to features in a known surface terrain data. The operator's position can be determined quickly and accurately, even where the surface terrain data includes some degree of noise or inaccuracy. In particular, in a first embodiment, a method of determining a geographic location from a comparison of an image of an environment and global data is performed; the method comprising the steps of obtaining data indicative of regions of the earth from a plurality of data sources, wherein the data indicative of the regions of the earth comprises at least elevation data, creating a grid of latitude by longitude cells from the data indicative of the regions of the earth and combining the data indicative of the regions of the earth to create region-specific data in each cell of the grid, receiving an image of the environment at the geographic location, analyzing the image of the environment to determine camera characteristics and image characteristics, comparing the camera characteristics and the image characteristics to the region-specific data in at least one of the cells, determining a list of likely geographic location candidates that match the environment in the image based on the comparison, and presenting the user with the list of geographic location candidates.

In a second embodiment, at least one non-transitory computer-readable media storing computer-executable instructions that, when executed by a processor, perform a method of determining a geographic location from a comparison of an image of an environment and region-specific data, the method comprising the steps of, obtaining data indicative of regions of the earth from a plurality of data sources, creating a grid of cells from the data indicative of the regions of the earth, combining the data indicative of the regions of the earth for each cell to create the region-specific data, creating masks within each cell to efficiently access the region-specific data for comparison, receiving the image of the environment from a camera, analyzing the image of the environment to determine camera characteristics and image characteristics, wherein the image characteristics comprises a set of evaluation points projected onto a horizon in the image, comparing the camera characteristics and the image characteristics to the region-specific data, determining an error between the image characteristics and the camera characteristics and the region-specific data, determining a list of geographic location candidates based on the error, and presenting the user with the list of geographic location candidates.

In a third embodiment, a system for determining a geographic location of an environment depicted in an image of the environment, a data store storing region-specific data indicative of a region of the earth, at least one non-transitory computer-readable media storing computer-executable instructions that, when executed by a processor, perform a method of determining a list of geographic locations from a comparison of the image and the region-specific data, the method comprising the steps of obtaining data indicative of the earth from a plurality of data sources, wherein the data indicative of the earth comprises at least landmarks and elevation data, creating a grid of cells from the data indicative of the earth and combining the data indicative of the earth to create the region-specific data in each cell of the grid, receiving the image of the environment, analyzing the image of the environment to determine camera characteristics and image characteristics, comparing the camera characteristics and the image characteristics in the image to the region-specific data in at least one of the cells, determining a list of likely geographic location candidates that match the geographic image based on the comparison, and presenting the user with the list of geographic location candidates.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTIONS OF THE DRAWING FEATURES

Embodiments of the invention are described in detail below with reference to the attached drawing figures, wherein.

Figure 7A:
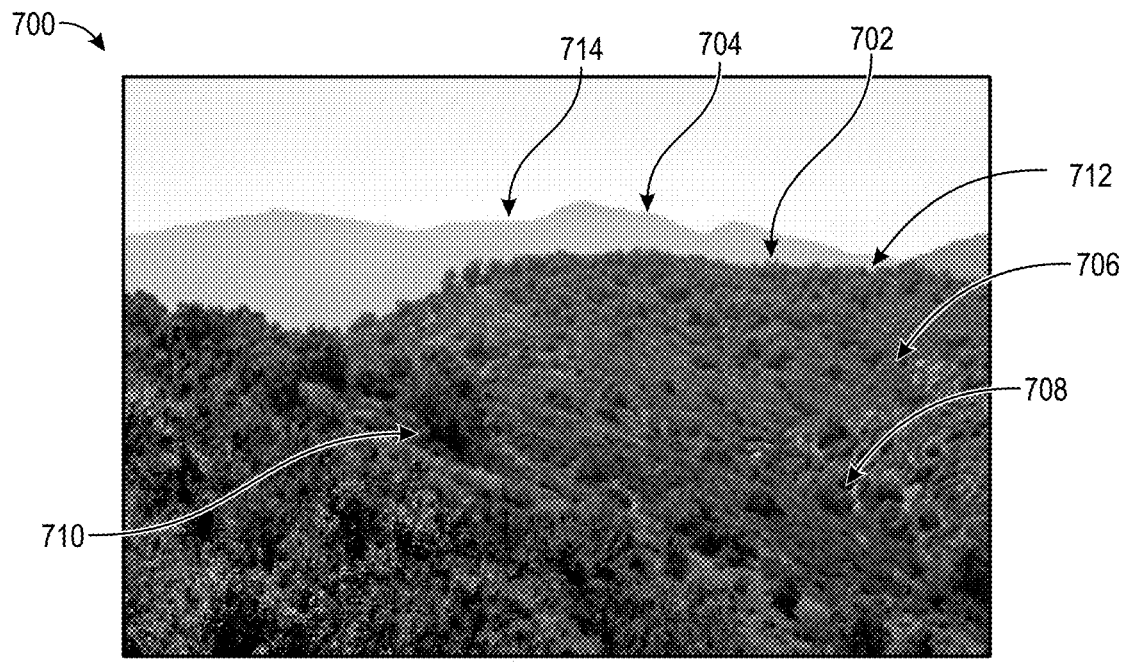
Figure 7B:
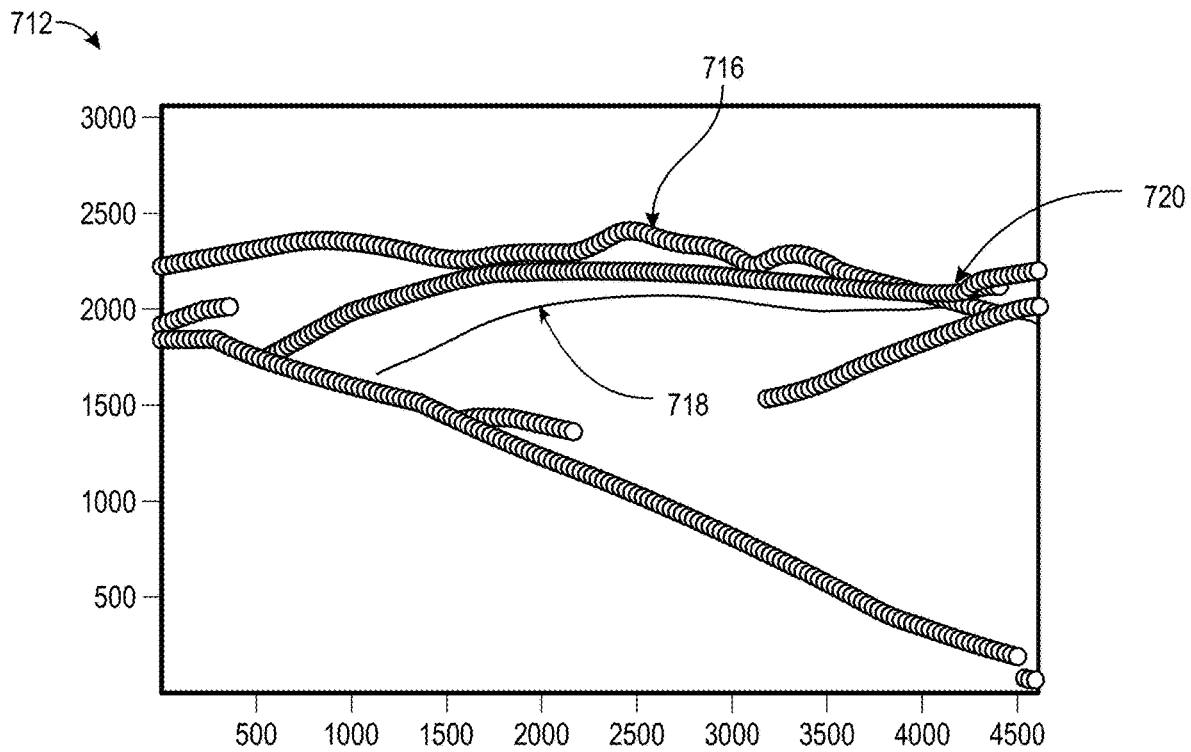
Figure 7C:
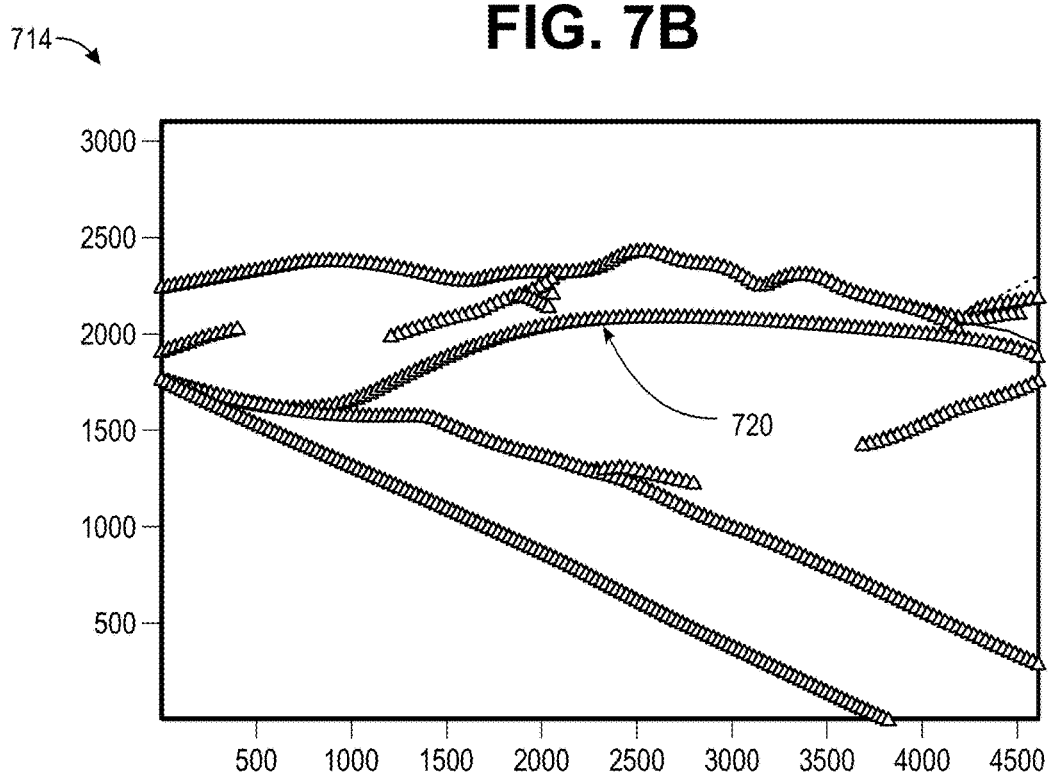
Figure 8:
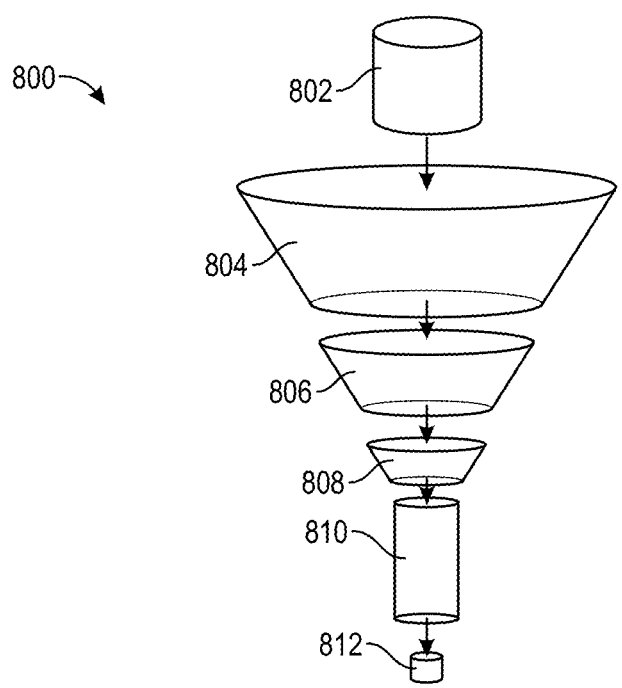

FIGS. 7A-C depict fine matching comparisons of Geographic Knowledge Base data adjusted to fit image ridgelines; and FIG. 8 depicts a flowchart illustrating the operation of a method of reducing the number of geographic candidates in accordance with one embodiment of the invention.

The drawings do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention perform geolocation of images taken at unknown locations. Large amounts of possible locations may be eliminated with rough estimates such that a more rigorous analysis of a smaller set of data may be performed. In particular, embodiments of the invention can determine a list of likely locations based on photographs and videos taken by a user. In some embodiments, open source data of the Earth's surface may be combined to produce a Geolocation Knowledge Base (GKB). The GKB may comprise elevation, landmarks, landcover, water bodies, water lines, and any other data that may be useful. Further, in some embodiments, the Earth's surface may be broken up into grids to narrow the field of search to small and smaller areas to reduce the data analysis. Characteristics of the image, the camera, and the relative details within the image may be compared to GKB information at grid points to determine a list of candidate geolocations.

In some embodiments, the list of locations may be determined with relative likelihood based on information such as estimates of tilt range, roll range, and relative distance to objects in the image.

Further, the objects present in the image such as, for example, horizons, ridgelines, landcover, and landmarks may be used. The image and camera information may be compared to the information in the Geolocation Knowledge Base (GKB) to determine matching errors with similar terrain. The list of likely location matches based on the likelihood of the match may be provided to the user.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Figure 1:
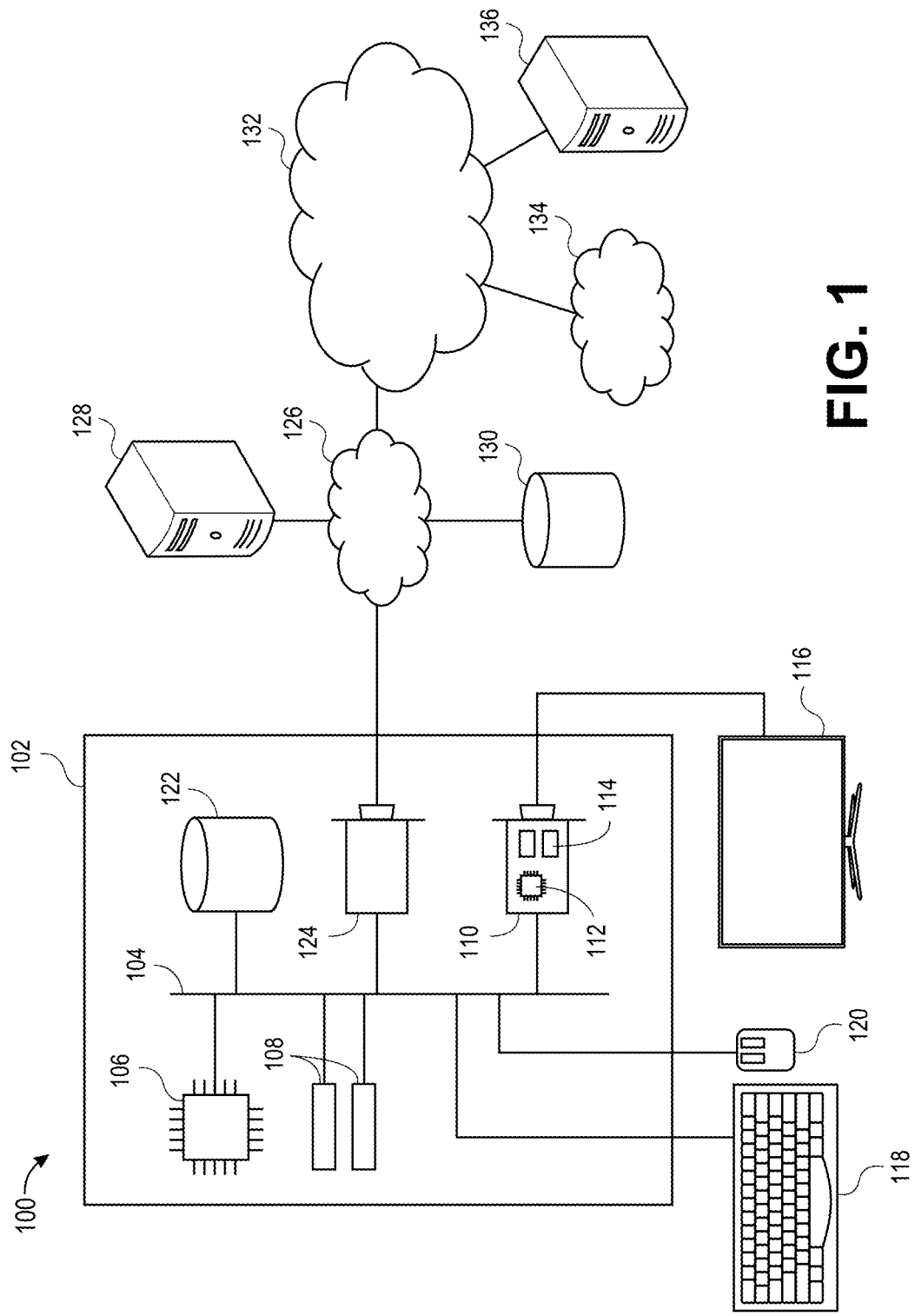
FIG. 1 depicts an exemplary hardware platform for certain embodiments of the invention.

Turning first to FIG. 1, an exemplary hardware platform 100 for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, in some embodiments, network interface card (NIC) 124 is also optionally attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
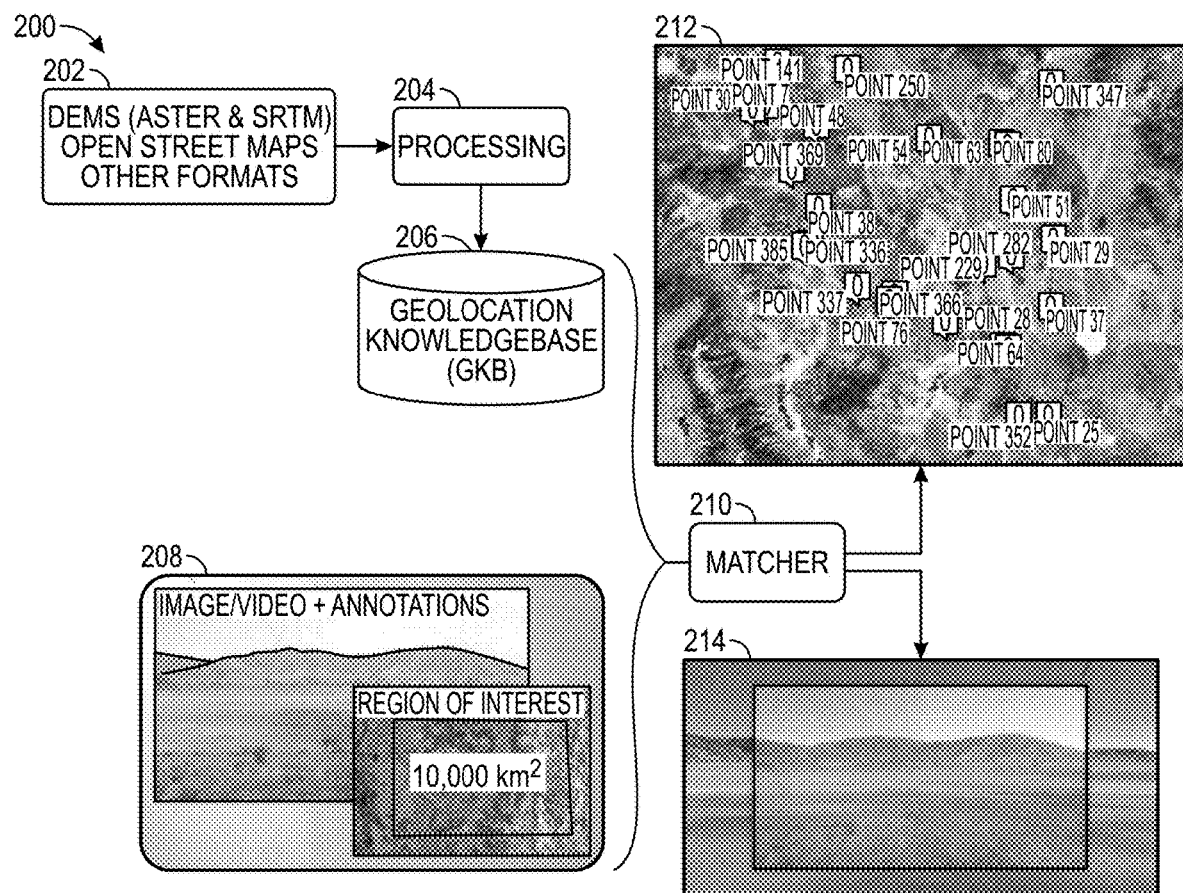
FIG. 2 shows a schematic depiction of a process of matching an image with Geographical Knowledge Base data.

In some embodiments, as depicted in FIG. 2, a process for determining a list of geolocation candidates, generally referenced by numeral 200, may comprise combining global open source data indicative of features of the earth's surface and object on the earth's surface and comparing with data obtained by a user. An image obtained by the user and the global data may then be compared to determine a list of candidate geographic locations of the environment depicted in the image. At step 202, global data is obtained. The global data may be geographic data that, in some embodiments, may be open source data. The geographic data may be obtained via satellites, aerial vehicles, and ground/water collection methods. The global data may include images, video, annotation, any user added text, location information, relative distance information between objects, topography, landmarks, or any other information that may be useful as described in embodiments herein. Open source data may be collected from Digital Elevation Models based on monoscopic or stereo pair imaging, radar, and elevation measurements. In some embodiments, the Digital Elevation Models are collected from Advanced Spaceborne Thermal Emission and Reflection Radiometer (ASTER), Shuttle Radar Topography (SRTM), TerraSAR-X add-ons for digital elevation measurements (TanDEM-X), and any other DEM.

Further, in some embodiments, open source land cover data may be obtained for comparison with the images. The land cover data may be obtained from GeoCover Landsat 7 data, LandScan global population distribution data for urban and rural environments, and Dynamic Land Cover Dataset (AU DLCD) for vegetation indexes.

In some embodiments, crowd-sourced datasets of streets, rivers, landmarks, and any other information supplied by people may be used. In one example, this information may be obtained from Open Street Map (OSM). Further, in some embodiments, country lines may be obtained from country outlines (such as ArcGIS data), shoreline data may be obtained from the National Oceanic and Atmospheric Organization (NOAA), and cell tower information may be used from Open Cell ID. The data may be combined to create information indicative of any region in the world and may generally be referred to as region-specific data or global data.

The global data covers most of the world and, therefore, provides expansive coverage of the earth for visual-based location determination. The global data may be combined to create data that is indicative of elevation, landmarks, and natural and man-made structures at worldwide locations. In some embodiments, the global data from each of the sources may be combined and into a large data set and masks created for categorization and efficient access and comparison. Further, the data may be broken up into various regional locations based on grid creation over the earth's surface as described in some embodiments below.

In some embodiments, the global data may be processed in block 204 to create a Geolocation Knowledge Base (GKB) 206. The global data comprising streets, rivers, landmarks, elevations, and other environmental object data may be separated into one-degree latitude by one-degree longitude cells across the surface of the earth as depicted in block 302 in FIG. 3. In some embodiments, the cells are created from a 0.2- by 0.2-degree grid. This creates a grid that reduces the global view of the earth to focus on smaller cells, individually. From the open source data each cell may be analyzed to determine the cells that contain land and water and outlines of the land may be determined. Further, cells that contain DEM data and contain land may be determined.

In some embodiments, masks may be created for different objects contained within each cell. For example, masks may be created for ocean, land, vegetation, desert, forest, urban, rural, mountains, hills, valleys, ridgelines, houses, buildings, or any other feature in the environment that may be categorized to create efficient search queries and stored in the GKB. The masks are discussed in more detail below.

In some embodiments, the GKB in block 206 may be any database accessible by the user in the field. The GKB may be accessed wirelessly or may be stored on a hard drive accessible by the user. In some embodiments, portions of, or all of, the GKB may be stored on a user device. For example, the user may be a military soldier stationed in Afghanistan. Because the soldier is expected to be in this region only, data indicative of Afghanistan is stored. Only cells and grid points in Afghanistan may be stored, reducing the information that may be analyzed. Further, the soldier may be on a mission in a particular region of Afghanistan such as Kabul.

In this situation, the user may only require data indicative of Kabul. This may reduce the amount of data that may be filtered while in the field and reduce the time to run the image against the region-specific data. Further, in some embodiments, the user may input an expected region in which the user is located and the matching search may begin with, or be limited to, that region or general location. In some embodiments, the region-specific data may generally reference global data or a reduced data subset of the global data such as, for example, Afghanistan and Kabul.

At block 208 the image is collected by the user and submitted for location query. The image may be collected by any camera or video and any associated metadata and added text and user annotations may be provided with the image. In some embodiments, the user may add annotations by text input and in some embodiments, the user may provide outlines of objects directly on the screen and store the image with the annotations. The user may further provide a general region of interest to immediately narrow the matching region of interest and reduce the data to be processed.

After the GKB is created from the global data and the image is obtained from the user, the image may be compared to region-specific data which may be the global data or may be a subset of the global data narrowed to the region of interest. In some embodiments, the output is a list of location candidates as depicted in block 212 and a ground view from each location may be viewed as in block 214. Block 214 presents the image obtained from the user with on overlay of the most likely geographic location determined based on the least amount of error between the image and the geographic location candidate.

Figure 3:
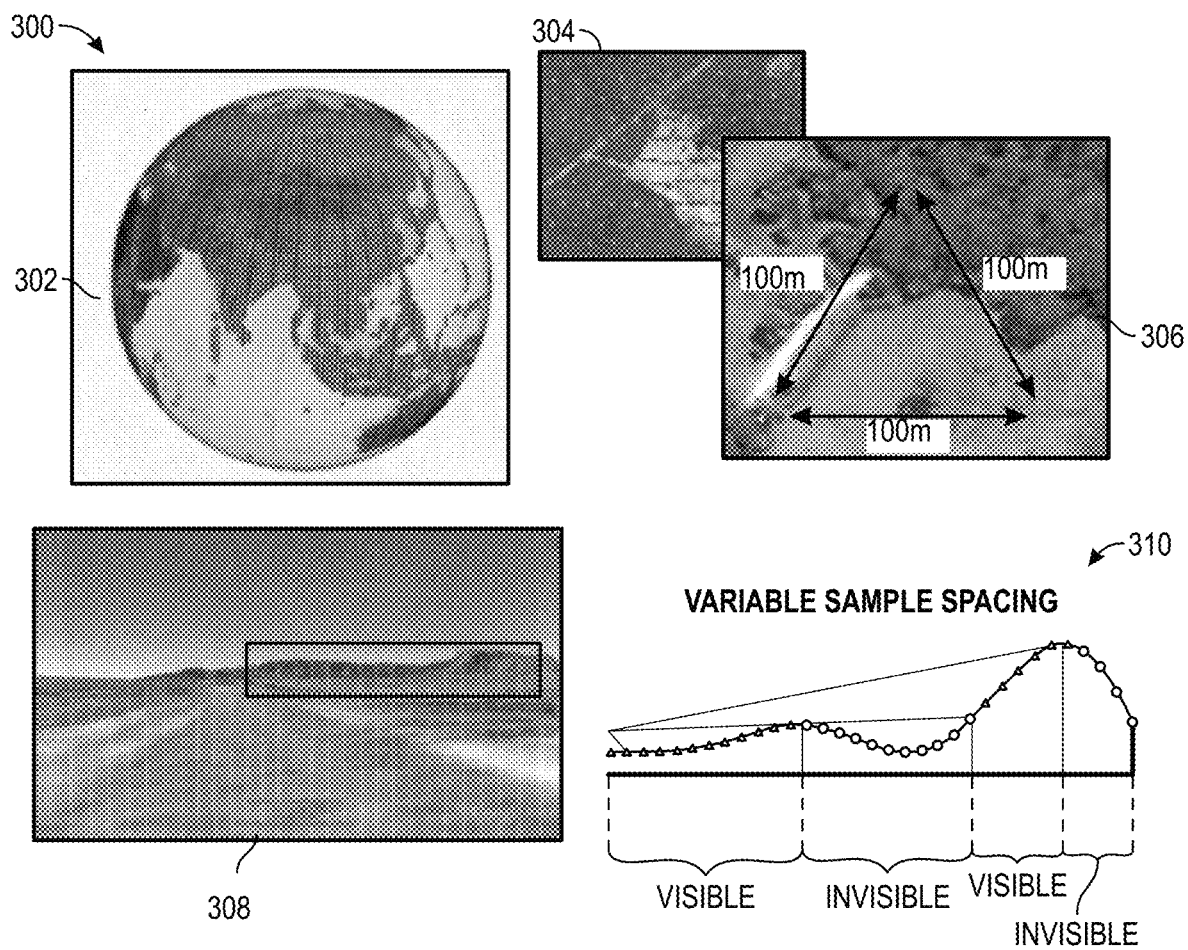
FIG. 3 depicts exemplary grids to narrow the search fields of the Earth's surface.

FIG. 3 depicts an exemplary process of creating the GKB generally referenced by numeral 300. Once the global geographic data is gathered as described above, the global data may be fused together and masks created to create an efficient matching process. This data processing may be performed to narrow search queries thus reducing the overall amount of data processing. In some embodiments, the area of the earth may be divided into a one-degree latitude by one-degree longitude, or 0.2-degree by 0.2-degree, grid as shown in block 302. Once the grid is determined, each cell of the grid may be analyzed. Lines between land and water may be determined. Cells that contain DEM data and contain land may further be determined. These initial determinations may reduce the data to be analyzed based on the general location and the content of the images from the user. For example, if the image appears to be taken on land, only the cells containing land should be analyzed. Alternatively, if a shoreline is present in the image, cells out of range of the shoreline may be eliminated from further analysis.

In some embodiments, the cells are further divided into triangular grids. As depicted in blocks 304 and 306, grid points are positioned 100 m apart creating a triangular grid. The triangular grid may further narrow the cell to smaller areas for analysis. At each grid point, a set of equally angularly-spaced lines radially projected from the grid point may be created. Along the lines, altitude and distance to ridgelines and any landmarks, and land cover may be computed. Block 306 depicts an exemplary view of three grid points with 100-meter distances between each grid point. This sets a 100-meter triangular grid in each cell of the global data.

Block 308 depicts an exemplary ridgeline 310 with intersecting visible points from the gridlines projected radially at one-degree increments from the grid point. The ridgeline 310 may be evaluated based on the intersection of the gridlines 312 with the horizon 310 in block 308. Further, any landmarks such as, for example, buildings, trees, streams, lakes, towers, roadways, power lines, or any other objects that may visible in the image may be compared to data stored in the GKB. Some points of the ridgeline 310 may be obscured by vegetation or buildings for example. The ridgeline 310 may be estimated at these points by creating splines of any polynomial dimension as shown in block 312. Further, the invisible ridgeline may be created using any mathematical algorithm that may be learned from natural ridgeline data. The data is compressed and stored in the GKB for comparison to ridgeline data obtained from the image as described below.

In some embodiments, masks may be created for the various data that may be recognized or otherwise input into the system. In some embodiments, the cells are analyzed for landmark data such as, for example, rivers, streams, major and minor roadways, intersections, power lines, buildings, parks, piers, sand, water, water line, wetland, urban, rural, or any other natural or man-made structure or feature that may be recognized and matched to image or user input data. The global data may be categorized into masks for comparison to the user and camera data. For example, masks may be created for flat, hills, mountains, low elevation, high elevation, elevation transitions, and any other elevation characterizations that may be useful. The elevation masks may be created from the DEMs.

In some embodiments, masks may optionally be created for land cover. The land cover masks may be broken down into vegetation, fields, forest, trees, water, urban water, urban greenway, rural, suburban, urban, dense urban, large urban building lot, large rural building lot, and any other land cover that may be useful.

In some embodiments, any data that may be collected and useful for generating masks may be used. For example, Multispectral Images (MSI) may be used for determining vegetation, waterways, water bodies, and any other land cover and landmarks. Further, OSM data may be used to determine water bodies and waterline heatmaps as well as roadways and intersections. Any data collected for analysis may be fused to generate the GKB.

The global data and the number of geographic location candidates may be reduced based solely on the information obtained from open source data. Regions, or cells, where there is a lack of information such as, for example, on the ocean, may be removed such that no analysis is provided. Further, rapidly changing regions such as deserts without any landmarks may also be removed. However, if landmarks or other recognizable indicators occur, these cells may be stored in the GKB. For example, a geolocation may not be recognizable from an image of the ocean from a boat, but if a buoy is in the image, and a recognizable feature such as an identification number is present, this may be stored in the GKB and a location may be determined.

In some embodiments, the user may obtain image and video information to submit a location query to the application for comparison to the GKB data for location determination as in block 208 in FIG. 2. The user may collect an image in any environment around the earth. The image information may be a single image, a panoramic image, or a plurality of images from a single location that may be analyzed in tandem or spliced together and analyzed together. The information in the image that may be analyzed may be horizon, ridgeline, landmarks, land cover, and any other information that is stored in the GKB and may be compared to the image data. Further, relative distances from the camera to features in the camera may be estimated as well as camera characteristics such as tilt, roll, field of view (FOV), lens distortion and any other characteristics that may be useful.

In some embodiments, camera pose may influence the comparison and error calculation between the image of the environment captured with the camera and the compared data from the GKB. For example, if the camera is tilted when the image is captured, there may be an error between the image and the compared data even when the compared data is of the same geographical location. For example, if the camera is tilted down, the difference between the mountain skyline captured by the camera and the projection of mountain elevations on the horizon may appear to be greater than actual. Similarly, if the camera is tilted upward the difference between the mountain skyline and elevation projections may appear to be lower. This could result in large error and possible incorrect or inconsistent location determinations based on the projected elevation comparisons. Further, if the camera has a roll or side tilt while the image is captured, a grade, or elevation change may be detected when there isn't one. The roll may cause error to increase from large positive on the left side of the image to large negative on the right, or vice versa depending on the direction of the roll. Because of these inconsistencies and possible introduced errors, the tilt and the roll of the camera as well as the relative distance to features in the image may be estimated. Estimates of the tilt and roll may be used to minimize the error between the annotated horizon projections of the DEM.

Figure 4A:
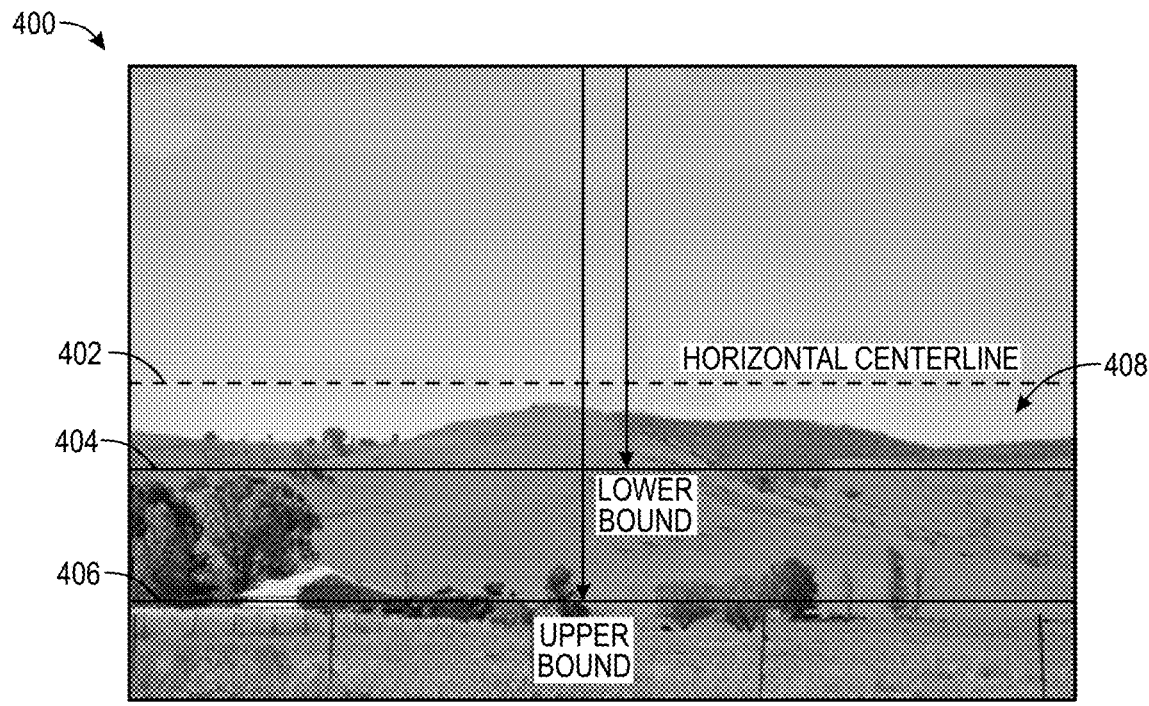
FIG. 4A depicts an exemplary tilt camera angle.

In some embodiments, it may be necessary to estimate the tilt of the camera when the image of the environment is captured. FIG. 4A depicts a tilted image 400 of an environment captured by the camera. The camera may be tilted up or down affecting the perceived elevation changes of the hills and objects in the image as described above. In this particular case the camera is tilted upward causing a center line 402 of the image to be in the sky. Objects in image may be used to estimate upper and lower bounds to constrain candidate solutions. An upper bound 406 and a lower bound 404 of the camera tilt may be estimated from the image of the environment. The horizontal centerline 402 of the image may be used against the horizon and the ground in the image 400 to estimate an actual horizon line and determine a range of tilt options for the camera. Further, a most likely tilt may be determined. The most likely tilt may be used to normalize the image such that it can be compared to the data in the GKB. Any GKB data matching the image within the upper bound 406 and the lower bound 404 may be stored for further analysis. The GKB locations more closely matching the normalized image may be given a higher likelihood of a geolocation match.

Figure 4B:
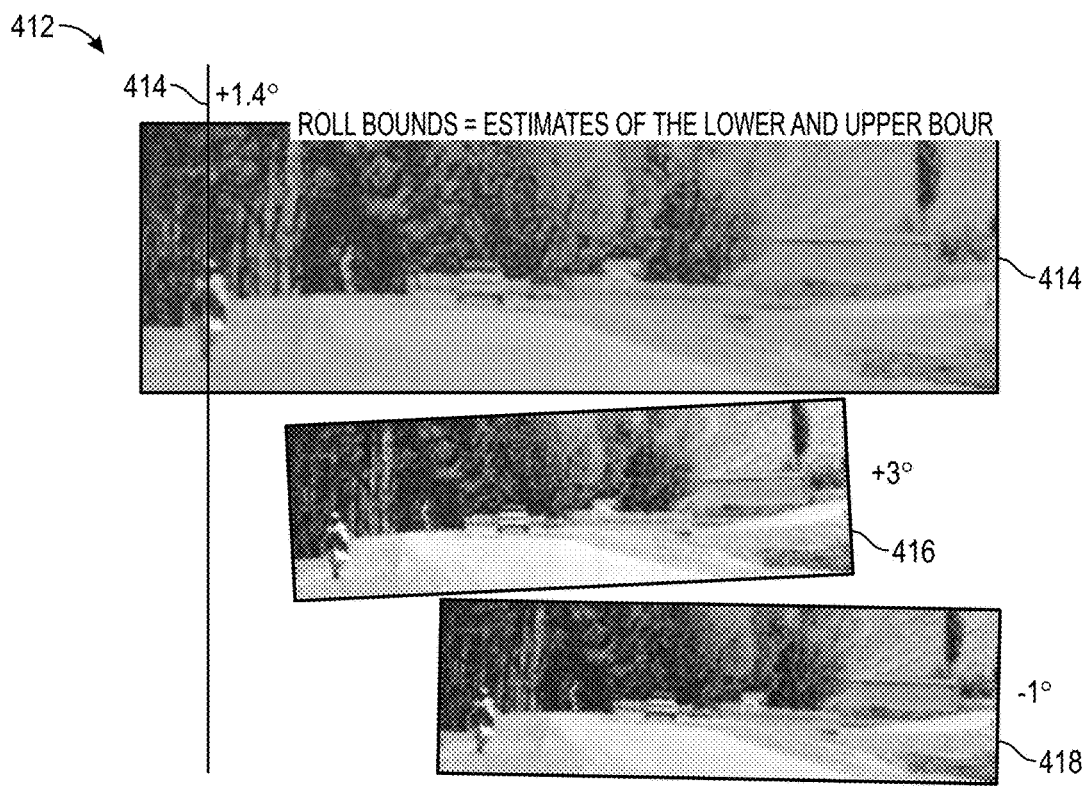
FIG. 4B depicts exemplary roll camera angles.

Similarly, camera roll may be estimated. FIG. 4B depicts a rolled image 412 of exemplary environment obtained by the camera that has a roll bias. Objects in the image may be used as well as the image boundary itself to estimate roll characteristics of the camera when the image was obtained to constrain candidate solutions. For example, buildings, towers, poles, or any other objects may be used to estimate the roll of the camera. A building edge may be assumed to be vertical. If the building edge is at a slight angle, the camera may be assumed to have a roll bias proportional to the angle. In FIG. 4B a motorcyclist is used to determine a vertical centerline through the motorcyclist and the roll angle of +1.4 degrees of the camera may be determined based on the centerline. The image may be normalized or adjusted to compensate for the angle around this vertical line. In some embodiments, a plurality of objects may be used and compared to a horizon or other objects to determine a likely roll and estimates of lower and upper bounds of camera roll may optionally be calculated. Block 414 depicts a +1.4-degree roll angle and blocks 416 and 418 represent +3- and −1-degree roll bias respectively.

Figure 4C:
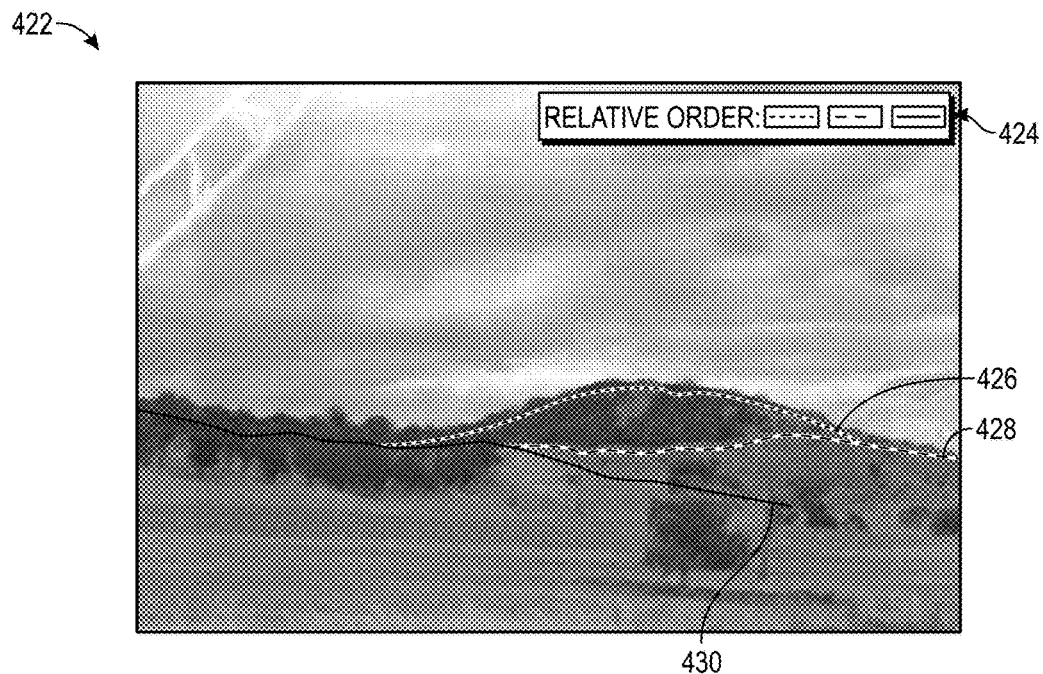
FIG. 4C depicts relative order of image objects.

In some embodiments, the terrain is recognized to determine the relative order of objects in the image. FIG. 4C depicts an image 422 of a hillside featuring several ridgelines. The relative order of the ridgelines can be determined based on the height and cover. For example, the first ridgeline 430 (closest to the camera) can be determined as it is the lowest in elevation and fully visible. Any ridgeline further from the camera must be higher in projected elevation to be present in the image. The next ridgeline 428 is between the first ridgeline 430 and the final ridgeline 426 which is the top line of the hill. The final ridgeline 426 may also be referred to as the horizon. In some embodiments, the farthest possible ridgeline from the camera may be the horizon. Depth ordering of the horizon and ridgelines may be used to eliminate geographic location candidates. The order and the ridgeline elevation may be used to determine the location of the user by utilizing focal length and heading error when compared to the GKB data as described below.

In some embodiments, the date, time, sun location, sun angle, stars, lakes, rivers, ocean, and any other visible environmental features may be used to determine camera characteristics such as tilt, roll, and relative order. For example, if the ocean is in view, the horizon may be used to determine tilt and roll very easily with the horizon of the ocean. The ocean horizon on a small scale is flat and level such that any angle may be relatively determined. Further, the sun location and angle relative to the horizon may be used to determine the camera angle.

Further, the location and angle of the sun and the location of the stars may be used in determining the geographic location of the environment in the image and user. The location of the sun and stars as well as the date and time may be used to narrow down the search to a smaller geographic area and, consequently a fewer number of cells and grid points for analysis. For example, the moon may appear in the image obtained by the user in a relative location to the big dipper. Based on the camera tilt and roll and the relationship between the moon, the stars, the horizon, and any other information obtained from the image, geolocation candidates that may not contain the relative information may be omitted from further analysis.

During the matching phase, the image, video, text description, annotations, and any other data is received from the user. The user input data is then compared to the GKB data to determine likely matches and provide the user with likely geolocation candidates. The matching process may go through a series of data reduction processes to reduce the data analysis and matching. The further the location can be narrowed, the fewer cells and grids that must be compared and, therefore, the faster potential matches can be found. Given the huge number of initial potential matches, reducing the data for comparison is important.

In some embodiments, the user may be a computer system as depicted in FIG. 1. The image, annotations, and any other information provided by the user described herein may be provided by a processor accessing one or more non-transitory computer-readable media storing instructions for capturing the image, recognizing objects and features, performing edge detection, and annotating any information determined and estimated. Any of the information provided to the system for determining the location may be provided by the computer system.

In some embodiments, the goal of rough matching is to reduce the number of location candidates by finding a combination of heading and Field of View (FOV) for each grid point that produces the smallest error. This can be accomplished by processing the query image by selecting a number of equally spaced points along the horizon, interpolate the horizon data for discrete radials at the evaluation points, calculate tilt and roll, match error for large numbers of grid points simultaneously, select optimal heading and FOV increments, and loop through discrete sets of headings and FOV and retain most likely "best" matches as described below. A person of skill in the art will recognize that focal length and FOV have a close relationship in optics and that focal length may be substituted for FOV, or vice versa, in the description and the calculations provide herein.

If a general location is known, all other data may be omitted from analysis. As in the example provided above, if a user knows that the location is in Kabul, Afghanistan, then Kabul is labeled as a region of interest and only cells within this region are analyzed. In some embodiments, this region is referred to as region-specific data. In some embodiments, the region-specific data may be all GKB data or any subset thereof.

In some embodiments, the image received from the user is evaluated for the horizon. Any information obtained and determined from the image submitted by the user may be referred to as image characteristics. A fixed number of equally-spaced evaluation points may be selected along the horizon. Using a fixed number of evaluation points allows for comparison of discrete ridgelines without comparing a large number of points. By comparing this relatively low number of points with GKB data, impossible candidates from the region-specific data of the GKB within the region of interest drop out quickly.

Further, the analysis calculates possible tilt, roll, and match error between the image and the GKB data for large number of grid points simultaneously. This is performed in a matrix calculation for all sets of grid points in the area of interest against the discrete evaluation points in the image. This process can be performed using efficient distributed and parallel processing and quickly reduces the number of possible candidates for further evaluation.

In some embodiments, from the remaining list of candidates, optimal heading and FOV increments are selected for further analysis of the candidates. In some embodiments, focal length may be substituted for FOV because they have a close optical relationship. Determining the FOV and heading optimal increments is described in detail below. The heading and the FOV for each increment for each candidate is compared to the image to determine the closeness, or the error between the image and the region-specific data. The elevation and ridgeline as well as any landmark and landcover may be compared. The heading and FOV for each candidate may be looped through the comparison and the top, most likely locations, or least error comparison between the heading and the FOV may be stored for further higher resolution analysis.

Figure 5:
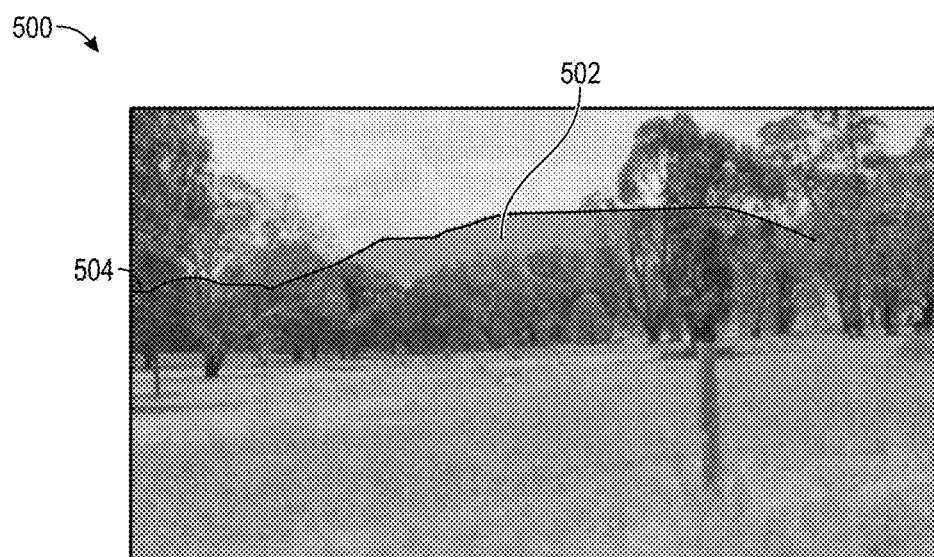
FIG. 5 depicts an exemplary image with a ridgeline compared to a Geographic Knowledge Base ridgeline.
Figure 5:
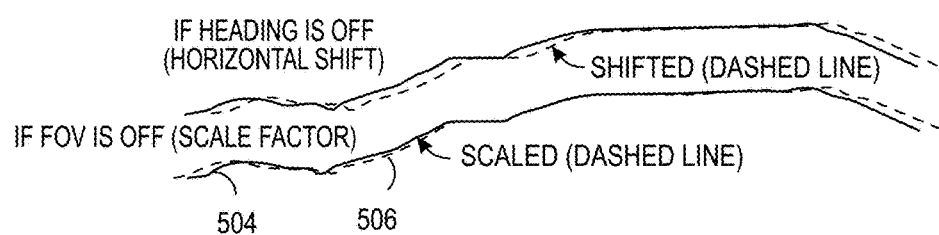

As depicted in FIG. 5 a candidate heading and FOV is matched for error evaluation. The actual recognized ridgeline of a mountain 502 is depicted as a solid line 504 and a matched ridgeline from the GKB data is shown as a dashed line 506. In some embodiments, the ridgeline may be traced by the user before submission such that the ridgeline does not need to be recognized. Here, the lines are representative of the evaluation points described above. The solid line is representative of the evaluation points projected in the image and the dashed line is representative of the horizon points evaluated from the radial projections from the grid points described above. If the heading is not correct the solid line 504 and the dashed line 506 are offset or shifted left or right. The amount of shift may indicate the amount that the heading is off based on the distance to the ridgeline. If the FOV is off, the scale of the dashed line 506 and the solid line 504 will be different. This may be indicative of a FOV difference and the distance to the ridgeline may be adjusted. The error calculation between the solid line 504 determined from the image and the dashed line 506 determined from the GKB data is provided in equation 1:

$$\text{Error} = \sqrt{\frac{1}{n}\sum(e_i)^2}, \quad (1)$$

(i.e., the root-mean-square error (RMSE)), where $e_i$ is the difference between the GKB ridgeline points and the ridgeline evaluation points projected on the image as described above. In some embodiments, other metrics may be used that generate a comparison between the GKB data and the image data.

Tilt and roll of the camera may also cause differences in the comparison of the image ridgeline and horizon and the GKB ridgelines and horizons. As described above the tilt may cause the ridgeline to be higher or lower in the image and the roll may cause the ridgeline to have a more positive or negative grade. These differences will also be adjusted as described above. In the example provided, the tilt and roll of the camera is already adjusted and assumed to be corrected.

In some embodiments, the error may have a direct correlation to the change in the FOV. For example, for at constant heading there may be a larger error for a smaller FOV. This is a result of the number of pixels in a given FOV. As FOV increases the number of pixels increases. Therefore, the relative error decreases. Ideally, FOV and heading increments must represent the same change in pixels for all FOV and heading combinations. For example, FOV varies progressively as described in equation 2:

$$\frac{fov_{i+1}}{fov_i} = \text{constant} = \left(\frac{fov_{max}}{fov_{min}}\right)^{\frac{1}{n-1}} \quad (2)$$

Heading increment ($\Delta h_i$) may be proportional to the FOV as described in equation 3:

$$\frac{\Delta h_i}{fov_i} = \text{constant} = \beta \quad (3)$$

The number of FOV and heading combinations may be determined using equation 4:

$$N = \sum_{i=1}^{n}\frac{360}{\Delta h_i} = \frac{fov_n}{\Delta h_n}\sum_{i=1}^{n}\frac{360}{fov_i} = \frac{fov_{max}}{\Delta h_{max}}\sum_{i=1}^{n}\frac{360}{fov_t} \quad (4)$$

By satisfying these requirements, the user inquiry may be similarly sensitive to changes in heading and FOV.

The optimal heading and FOV increments may be determined by selecting a FOV range, selecting N, determining $\beta$, and determining n. $\beta$ may be determined by evaluating the sensitivity of the skyline or horizon due to changes in FOV heading. In some embodiments, the maximum allowable error, or error due to worst case is $$\pm \frac{\Delta fov}{2} \text{ and } \pm \frac{\Delta h}{2}$$

and likelihood is determined as shown in equation 5:

$$\text{likelihood} = 1 - \frac{\text{error}}{\text{error}_{max}}. \tag{5}$$

A person of skill in the art will recognize that focal length and FOV have a close relationship in optics and that focal length may be substituted for FOV in the description and the calculations provide herein.

Figure 6:
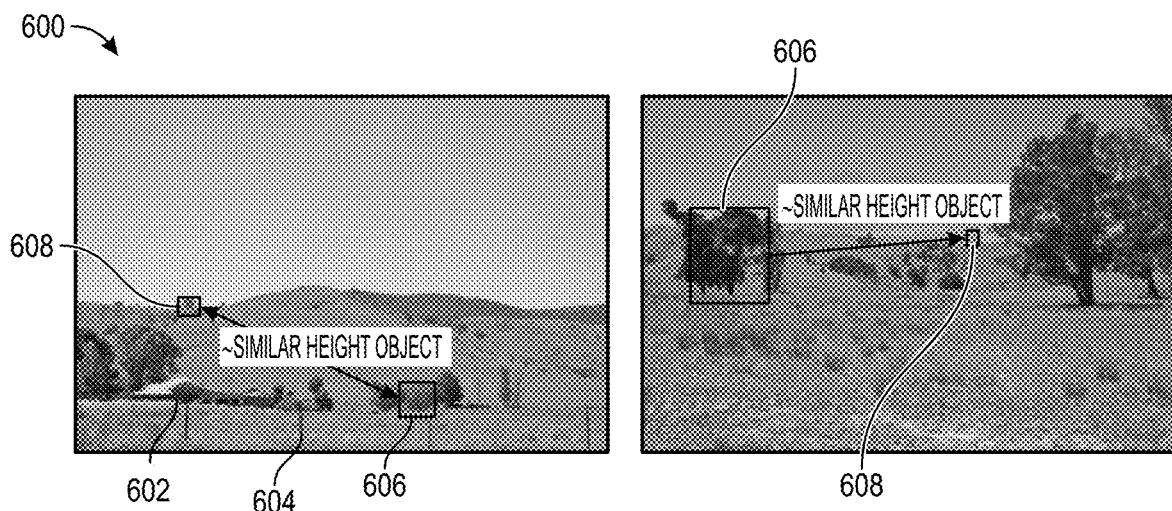
FIG. 6 depicts exemplary images with relative height comparisons.

Further, for matching and reduction of geolocation candidates, landmarks in the FOV may be verified. Any landmarks that are in the FOV of the image may be in the FOV determined by matching. The steps of determining landmarks and matching landmarks may be optional. Further, the system may optionally check for any further text or annotations provided by the user and verify that all is indicated. For example, in an urban environment, roads and intersections may be visible in the image. The roads and road angles must match as well as the horizon, skyline, and ridgelines. FIG. 6 depicts a rural environment. The house 602 in the image 600 may be a landmark that must be matched at the particular location. The fence 604 and the house 602 may be landmarks further used to narrow the list of geographic location candidates. Further, the landmarks in the image 600 must match the location in the image such that the relative elevation to the surrounding environment and the relative distances between other objects and landmarks match with the region-specific data.

Continuing with the embodiment depicted in FIG. 6, when object heights in the image 600 are unknown, relative heights may be used for matching. For example, the front trees 606 in the foreground may be a similar height to back trees 608 on the horizon. Without knowing the actual heights, a ratio of the tree heights may be determined and compared to the distances between the location in the foreground and the location in the background. This comparison may be made using the GKB data and relative locations of the trees in the image. This method may be particularly useful when comparing GKB data with query images that have non-distinct horizons such as flat grasslands. Landmarks may be compared in this way to match GKB data with the image landmarks to reduce the number of acceptable geolocation candidates.

In some embodiments, multi-frame annotations may be submitted for location query. The multi-frame images may be spliced together. The multi-frame image may comprise individually captured frame images or panoramic images. The images may be spliced together by matching the ridgeline and landmarks together. Camera tilt, roll, and relative depth of order may be compensated for as described above. To match multiple frame images of a location there may be minimum requirements. For example, in some embodiments, the images must be taken at most 250 meters apart with FOV estimates within four degrees and heading differences between ten degrees and forty-five degrees. These variances allow for accurate recognition and matching between the images such that a larger view of the environment can be compared to the GKB data. This larger image may result in more information for the image and eliminate GKB geographic candidates more quickly.

When rough matching is complete and a relatively small number of candidates remain, a fine matching sequence may be initiated to further find the most likely geolocations. FIGS. 7A-C depict a high resolution fine matching process. The fine matching process may adjust the FOV, heading, tilt, and roll of the rough candidates to minimize match error. The number of evaluation points along the ridgeline in the image may be increased to increase the resolution in the comparison. The horizon and ridge projections may be calculated directly from the DEM. Again, the match likelihood is given by equation 5, above.

FIG. 7A depicts a mountainous region 700 with a front mountain 702 and a back mountain 704. The front mountain has ridgelines 706, 708, and 710, and top line 712. The back mountain has top line 714. FIG. 7B depicts one loop of fine matching of a geographical candidate with an adjustment in the FOV to 67 meters from the 100-meter grid point as discussed above. FIG. 7C depicts a second loop with a further narrowing to 38 meters from the 100-meter grid point. In FIGS. 7B-C a large number of evaluation points 716 are provided across the ridgelines. It can be seen in FIG. 7B that the ridgeline 718 and the determined evaluation points for the ridgeline 720 do not match. In FIG. 7C through more loops and final refinement, the ridgeline from the image and the ridgeline from the region-specific data match. Each successive loop may narrow in on a closer match. If the refinement creates more error, then the matching is finished, and the error is compared to other candidates for presentation to the user.

In some embodiments, an uncertainty polygon may be created, and result clusters may be determined to determine proximate geographic candidates to known candidates. Uncertainty polygons may be created using the mean distance to the horizon from a grid point. The uncertainty polygons may be calculated as described in the equations below.

$$\Delta x = \frac{\Delta h}{2} \tilde{R} \tag{6}$$

$$\Delta y = \frac{\Delta fov/2}{fov} \tilde{R} \tag{7}$$

Where $\tilde{R}$ is median distance to the horizon from the grid point. After the uncertainty polygons are determined and combined cluster analysis may be used to identify alternative candidates that may exist inside the uncertainty polygons. In some embodiments, a 100 meter radius of uncertainty may be assumed for each grid point.

In some embodiments, after final refinement, the number of candidates may still be too large. A limit to the number of geolocation candidates may be created. An exemplary limit to the number of geolocation candidates may be 50 candidates total for the area searched. Pruning may optionally be implemented to rid the geolocation candidate list of excess geolocation candidates. For example, an error threshold may be set to exclude any geolocation candidates that have an error above the threshold. The threshold may be set to exclude by error or set to exclude by number. Further, the geolocation candidates may optionally be ranked by the error such that the highest ranking (least error) are ranked at the top and the lowest ranking (most error) rank toward the bottom. The candidates may be pruned based on this ranking system.

In some embodiments, the error thresholds may depend on the uniqueness and the proximity of query image features such as, for example, horizon, ridgelines, heading and radial alignment, visible land cover, and any other image features and GKB data as described above. In some embodiments, the error threshold further depends on annotated features and descriptions provided by the user such as, for example, a description of a road name or body of water. All image data and accuracy of the matching of the image data with the GKB data may be used for threshold and ranking systems.

FIG. 8 depicts an exemplary process for reducing the geolocation candidates to a manageable size for presentation to the user represented generally by the reference numeral 800. Initially, at step 802, the open source global data is collected and combined to create the GKB. The global data may be collected, and the usable earth surface area may be broken up into one-degree by one-degree grids as described above. In some embodiments, the surface may be broken up into 0.2-degree by 0.2-degree grid for more refined analysis. The geographic data may then be pre-analyzed and the open source mapping, DEM, and other satellite data, images, and annotations may be combined to create the digital environment for comparison to the image information. Further, the cells may be broken into 100-meter triangular grids. At each grid point of the triangular grid a radial projection of lines one-degree apart may be created. The elevation along the lines and intersection with the horizon may be determined for matching with ridgeline and horizon information determined from the image. Masks may be created for the data in each cell to efficiently match with the images as described in embodiments above.

At step 804, all grid points and cells created for storage in the GKB may be reduced by filtering data that does not have any land, landmarks, and any data usable for comparison to image information. This may include any ocean regions, or regions that are not supported by the data initially obtained from the open source data.

At step 806, geometric candidates are reduced based on the rough matching comparison to the image as described in embodiments above. The image is submitted by the user and received by the application. The image may be analyzed for camera characteristics such as tilt, roll, and relative depth order to features in the image. Further, ridgeline data and horizon data as well as landmarks, land cover, relative distances between features within the image, and relative sizes and actual sizes and distances of features within the image may be analyzed for comparison to the GKB region-specific data. The image data such as, for example, the horizon, may be evaluated at evaluation points projected onto the horizon to reduce the data to be analyzed. In some embodiments, a list of the lowest error geolocation candidates is determined and moved into the fine matching phase for further analysis.

At step 808, the list of geolocation candidates is analyzed in a fine matching process. Each candidate may be processed through a loop of successive higher fidelity matches adjusting the FOV and the heading as well as tilt and roll angles. Any data compared in the rough matching may be performed in the fine matching but with more evaluation points for higher resolution. When the lowest error geolocations are found a process of uncertainty polygon and result clustering is performed to determine the result confidence. Further, ranking the candidates based on the error calculations and pruning to only candidates with error below, or rank above, thresholds may be performed.

At step 810, the final list of geographic location candidates may be presented to the user. The list of geolocation candidates may be any amount from one candidate to the total global data. An amount threshold may be selected such as, for example, 300, 100, 10, or any other number. In some embodiments, the threshold for candidate list amount may be based on the error for each, or for a plurality of, geometric candidates compared to the image query.

In some embodiments, the user may view the locations of the geometric candidates from satellite images and from ground view. The user may provide feedback and another query, and the analysis may be performed using the feedback.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

The invention claimed is:

1. One or more non-transitory computer-readable media storing computer-executable instructions that, when processed by one or more processors, performs a method of determining a geographic location from a comparison of an image of an environment with data indicative of a region of earth stored on a mobile device, the method comprising:
   obtaining the data indicative of the region of the earth, wherein the data indicative of the region of the earth comprises at least elevation data;
   storing the data indicative of the region of the earth on the mobile device;
   receiving the image of the environment at the geographic location by a camera;
   storing the image on the mobile device;
   analyzing the image to determine horizon data indicative of a horizon in the image;
   analyzing the image to determine ridgeline data indicative of a ridgeline between the camera and the horizon;
   comparing the horizon data and the ridgeline data from the image with the data indicative of the region of the earth;
   determining at least one likely geographic location candidate that matches the environment in the image based on the comparison; and
   causing display of the at least one likely geographic location candidate.

2. The media of claim 1, wherein the data indicative of the region of the earth is a subset of global data and is specified by a user based on an expected geographic location.

3. The media of claim 1,
   wherein the data indicative of the region of the earth comprises cells and wherein the horizon data comprises horizon evaluation points;

wherein the method further comprises:
dividing the cells into grids comprising radial projection lines from each grid point of each grid;
evaluating projection elevation along each radial projection line; and
comparing the horizon evaluation points with the projection elevation along each projection line to determine the at least one likely geographic location candidate.

4. The media of claim 1, wherein the method further comprises:
determining a plurality of likely geographic location candidates; and
ranking the plurality of likely geographic location candidates based on a probability that each likely geographic location candidate of the plurality of likely geographic location candidates matches the geographic location.

5. The media of claim 1, wherein the camera is disposed on the mobile device.

6. The media of claim 1, wherein the method further comprises: generating mask data in the data indicative of the region of the earth to efficiently compare the data indicative of the region of the earth with the horizon data.

7. The media of claim 1, wherein the image data is obtained by a plurality of cameras.

8. The media of claim 7, wherein the method further comprises:
determining tilt and roll of the plurality of cameras; and
adjusting the image based on the tilt and the roll of the plurality of cameras before comparing the horizon data to the data indicative of the region of the earth.

9. The media of claim 8, wherein the tilt and the roll of the plurality of cameras is determined by analyzing the image.

10. A system for determining a geographic location from a comparison of an image of an environment with data indicative of a region of earth stored on a mobile device, the system comprising:
a camera for generating the image of the environment;
a data store for storing the image and the data indicative of the region of the earth;
one or more processors; and
one or more non-transitory computer-readable media storing computer-executable instructions that, when processed by the one or more processors, performs a method of determining the geographic location from the comparison of the image of the environment with the data indicative of the region of the earth stored on the data store of the mobile device, the method comprising:
obtaining the data indicative of the region of the earth, wherein the data indicative of the region of the earth is a subset of a global data set,
wherein the global data set is indicative of a plurality of regions of the earth;
wherein the data indicative of the region of the earth comprises at least elevation data;
storing the data indicative of the region of the earth on the mobile device;
receiving the image of the environment at the geographic location by the camera;
storing the image at the data store on the mobile device;
analyzing the image to determine horizon data indicative of a horizon in the image;
determining ridgeline data indicative of a ridgeline between the horizon and the camera;
comparing the horizon data and the ridgeline data from the image with the data indicative of the region of the earth;
determining at least one likely geographic location candidate that matches the environment in the image based on the comparison; and
causing display of the at least one likely geographic location candidate by the mobile device.

11. The system of claim 10, wherein the comparison of the horizon data with the data indicative of the region of the earth is performed by one of distributed processing or parallel processing on the mobile device.

12. The system of claim 10, wherein the method further comprises:
determining a plurality of likely geographic location candidates;
pruning the plurality of likely geographic location candidates based on a determined error between each of the plurality of likely geographic location candidates and the data indicative of the region of the earth to determine a remaining plurality of likely geographic location candidates; and
ranking the remaining plurality of likely geographic location candidates based on a probability that each of the remaining plurality of likely geographic location candidates matches the geographic location.

13. The system of claim 10,
wherein the data indicative of the region of the earth comprises cells and wherein the horizon data comprises horizon evaluation points;
wherein the method further comprises:
dividing the cells into grids comprising radial projection lines from each grid point of each grid;
evaluating projection elevation along each radial projection line to determine projection elevation points; and
comparing the horizon evaluation points with the projection elevation points along each radial projection line to determine the at least one likely geographic location candidate.

14. The system of claim 13, wherein the method further comprises:
increasing a number of horizon evaluation points to generate refined horizon data; and
comparing the refined horizon data with the data indicative of the region of the earth to determine a refined comparison data set.

15. A method of determining a geographic location from a comparison of an image of an environment with data indicative of a region of earth stored on a data store of a mobile device, comprising:
obtaining the data indicative of the region of the earth, wherein the data indicative of the region of the earth comprises at least elevation data;
storing the data indicative of the region of the earth on the mobile device;
receiving the image of the environment at the geographic location by a camera;
storing the image on the mobile device;
analyzing the image to determine horizon data indicative of a horizon in the image;
analyzing the image to determine ridgeline data indicative of a ridgeline between the horizon and the camera;
comparing the ridgeline data with the data indicative of the region of the earth to obtain a first comparison result;

comparing the horizon data from the image with the data indicative of the region of the earth to obtain a second comparison result;

determining at least one likely geographic location candidate that matches the environment in the image based on the first comparison result and the second comparison result; and causing display of the at least one likely geographic location candidate.

16. The method of claim 15, wherein the data indicative of the region of the earth is a subset of global data and is specified by a user based on an expected geographic location.

17. The method of claim 15, determining tilt and roll of the camera; and adjusting the image based on the tilt and the roll of the camera before comparing the horizon data to the data indicative of the region of the earth.

18. The method of claim 15, further comprising:

determining a plurality of likely geographic location candidates; and ranking the plurality of likely geographic location candidates based on a probability that each likely geographic location candidate of the plurality of likely geographic location candidates matches the geographic location.

19. The method of claim 15, further comprising: increasing a number of horizon evaluation points to generate refined horizon data and comparing the refined horizon data with the data indicative of the region of the earth to determine a refined comparison data set.

20. The method of claim 15, wherein the data indicative of the region of the earth comprises cells and wherein the horizon data comprises horizon evaluation points, wherein the method further comprises:

dividing the cells into grids comprising radial projection lines from each grid point of each grid;

evaluating projection elevation along each projection line to determine projection elevation points; and comparing the horizon evaluation points with the projection elevation points along each projection line to determine the at least one likely geographic location candidate.

* * * * *